(12) United States Patent
Kudo et al.

(10) Patent No.: US 7,138,005 B2
(45) Date of Patent: Nov. 21, 2006

(54) NICKEL REFINING METHOD

(75) Inventors: Keiji Kudo, Ehime-ken (JP); Masaki Imamura, Ehime-ken (JP); Kouji Ando, Ehime-ken (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 16 days.

(21) Appl. No.: 10/238,022

(22) Filed: Sep. 9, 2002

(65) Prior Publication Data

US 2003/0066389 A1    Apr. 10, 2003

(30) Foreign Application Priority Data

Sep. 11, 2001    (JP) ............... 2001-275671

(51) Int. Cl.
C22B 23/00    (2006.01)
C22B 23/06    (2006.01)

(52) U.S. Cl. .................................................. 75/714

(58) Field of Classification Search .................. 75/714, 75/743, 738; 205/591
See application file for complete search history.

(56) References Cited

U.S. PATENT DOCUMENTS 3,880,653 A * 4/1975 Hougen ...................... 205/591
6,176,997 B1 * 1/2001 Shelp et al. ................. 205/337

FOREIGN PATENT DOCUMENTS

| GB | 1 378 051 | 4/1975 |
|---|---|---|
| GB | 1 520 117 | 8/1978 |
| JP | 06-116660 | 4/1994 |
| JP | 07-091599 | 4/1995 |
| JP | 10-140257 | 5/1998 |

* cited by examiner

*Primary Examiner*—Roy King
*Assistant Examiner*—Kathleen McNelis
(74) *Attorney, Agent, or Firm*—Katten Muchin Rosenman LLP

(57) ABSTRACT

The present invention provides a nickel refining method which uses nickel sulfide produced from nickel oxide ore using a hydrometallurgical process, as the raw material, and in which chlorine leaching is performed using a chloride solution, wherein a cementation reaction is caused between the nickel sulfide and copper ions, using copper ions, preferably included in the leaching solution itself, and a portion of the nickel in the nickel sulfide is leached into the solution, and the remaining nickel and copper are left as a residue, and copper and nickel are chlorine leached from this residue, and wherein the cementation reaction is performed with an oxidation-reduction potential as measured by a silver-silver chloride electrode of below −20 mV, preferably below −100 mV.

9 Claims, 2 Drawing Sheets

NICKEL REFINING METHOD

TECHNICAL FIELD TO WHICH THE INVENTION BELONGS

The present invention relates to a nickel refining method for recovering nickel from nickel sulfide by means of hydrometallurgy.

PRIOR ART

Nickel refining methods such as those disclosed in Japanese Patent Publication No. Tokukai Hei 7-91599, for example, in which a nickel raw material containing nickel sulfide such as nickel matte is leached with chlorine gas and electrowinning is then performed to obtain nickel, are in current use. The method is simple, and also allows cost saving operation such as reusing the chlorine gas produced by electrowinning in the leaching process.

In this process, separation is performed so that only nickel is leached from the nickel raw material by the chlorine gas, in the form of nickel chloride, leaving a residue of elemental sulfur. The separated sulfur, being a solid, is easy to manage, and also has high utility value in that it can be reused in the process of refining nickel matte from nickel oxide ore.

However, if there is insufficient chlorine gas in the leaching process, the nickel and the sulfur are not completely separated, and the nickel is not sufficiently leached, and remains as a residue, thereby lowering the nickel recovery rate. Conversely, if an excessive amount of chlorine gas is used in the leaching process, then even the sulfur is oxidized, which may cause the $SO_4$ ion concentration in the leaching solution to increase.

If the $SO_4$ ion concentration increases, the electrolytic cell voltage in the nickel electrowinning process increases, resulting in an increase in the electrical power costs, and furthermore oxygen gas is also evolved at the anode, in addition to chlorine gas, during the electrolytic winning process. As a result, reusing the chlorine gas becomes difficult, and problems such as an inability to achieve a chlorine balance will start to occur.

The nickel raw material used in this process is nickel matte produced either from nickel sulfide ore, or nickel oxide ore adding sulfur using a pyrometallurgical process.

The sulfur in the nickel matte obtained in this manner is normally present as $Ni_3S_2$, and even during chlorine leaching, oxidation to $SO_4$ is unlikely to occur, as the physical properties of the sulfur are relatively stable.

On the other hand, as shown in Japanese Patent Publication No. Tokukai Hei 6-116660, there is also a method for recovering nickel as nickel sulfide obtained from nickel oxide ore using a hydrometallurgical process. Attempting to apply a chlorine leaching method within this method causes the nickel sulfide produced using the hydrometallurgical process to become unstable, and during chlorine leaching, the sulfur of the nickel sulfide oxidizes easily, causing an increase in the $SO_4$ ion concentration in the leaching solution and an increase in the amount of $Cl_2$ used. Consequently, nickel sulfide obtained from nickel oxide ore using a hydrometallurgical process has been unsuitable as a raw material for the chlorine leaching method.

Consequently, in order to broaden the range of raw materials which can be used in nickel refining using the chlorine leaching method described above, a method is desired in which nickel can be leached from nickel sulfide produced from nickel oxide ore using a hydrometallurgical process, without oxidizing the sulfur contained therein.

SUMMARY OF THE INVENTION

An object of the present invention is to provide a nickel refining method for nickel sulfide produced from nickel oxide ore using a hydronmetallurgical process, which suppresses the oxidation of sulfur and has an increased leach rate when compared to conventional methods, and which enables the effective leaching of nickel and cobalt.

DETAILED DESCRIPTION OF THE INVENTION

Figure 1:
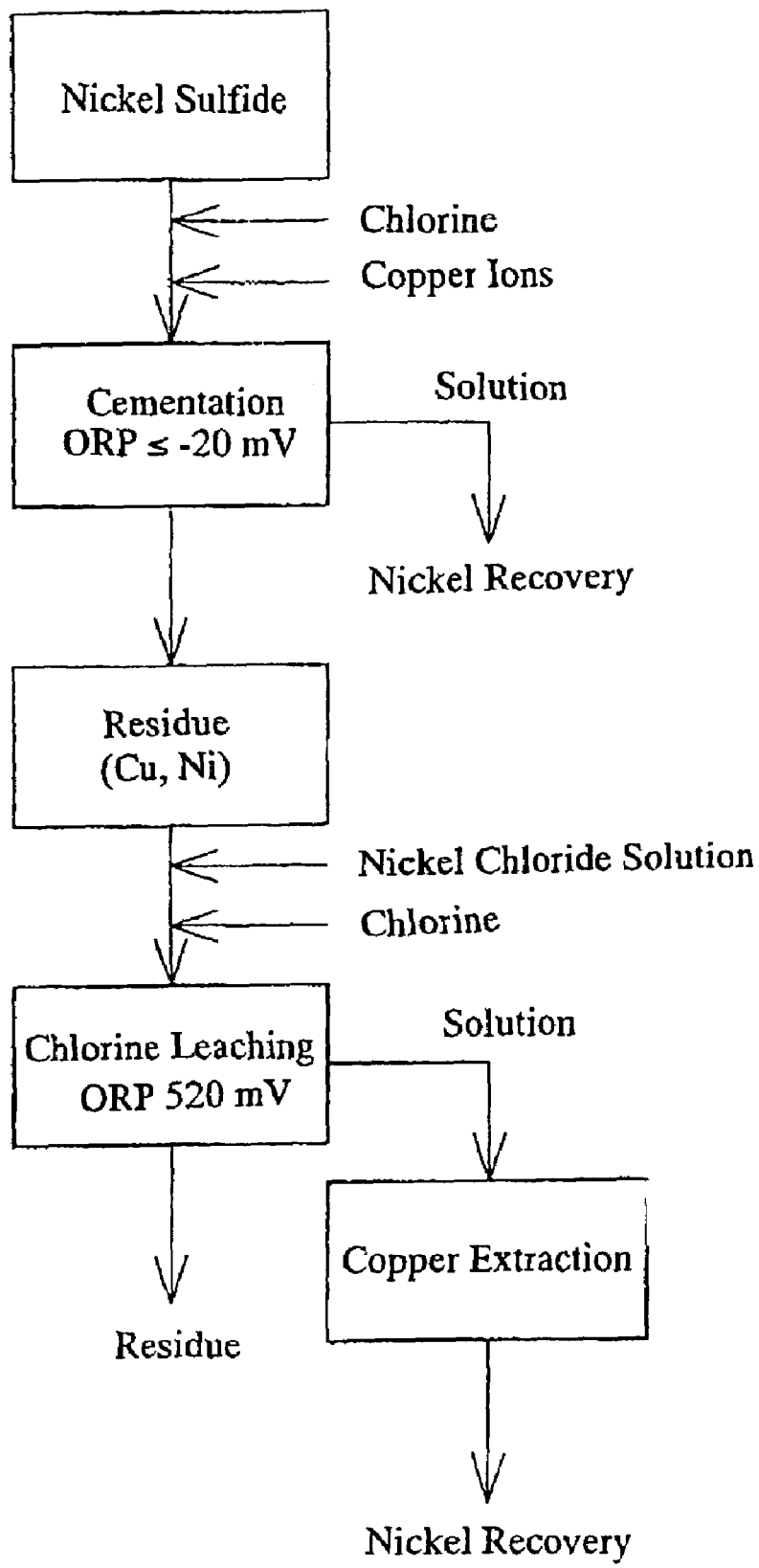
FIG. 1 is a flow chart to show a refining method of nickel according to the present invention.

In order to solve the problems described above, the present invention provides a nickel refining method which uses nickel sulfide produced from nickel oxide ore using a hydrometallurgical process, as the raw material, and in which chlorine leaching is performed using a chloride solution. For example, before chlorine is used for leaching nickel sulfide precipitated from nickel ions from an aqueous solution incorporating nickel using hydrogen sulfide or the like, a cementation reaction is caused between the nickel sulfide and copper ions, preferably using copper ions included in the leaching solution itself, and a portion of the nickel in the nickel sulfide is leached into the solution, and the remaining nickel and copper are left as a residue, and copper and nickel are chlorine leached from this residue.

The copper ions are supplied as a liquid containing copper ions (either monovalent or bivalent). In an industrial setting, the solution obtained by chlorine leaching of the aforementioned residue can be reused.

Preferably the cementation reaction is performed with an oxidation-reduction potential as measured by a silver-silver chloride electrode of below −20 mV. More preferably this is performed with an oxidation-reduction potential below −100 mV.

Preferably nickel matte containing copper is used as a source of the copper ions for the cementation reaction and included in the raw materials.

The inventors focused on the fact that nickel sulfide produced using a hydrometallurgical process involving specifically hydrogen sulfide precipitation and the like separates into fine particles more readily than a nickel matte produced using a pyrometallurgical process involving a refining process, and consequently oxidation of the sulfur proceeds more readily, and the $SO_4$ ion concentration in the leaching solution increases more readily.

Furthermore, the inventors discovered that excess sulfur is present in nickel sulfide produced using a hydrometallurgical process, and that this tends to oxidize easily, which is a major factor in the increase in $SO_4$ ion concentration in the leaching solution.

In order to further investigate this factor, the inventors examined nickel matte produced using a pyrometallurgical process and nickel sulfide produced using a hydrometallurgical process using chemical analysis and X-ray diffraction and the like, and as a result, discovered that the $Ni_3S_2$ and NiS peak intensities in nickel matte produced using a pyrometallurgical process are both high, whereas nickel sulfide produced using a hydrometallurgical process shows a high $Ni_3S_4$ peak intensity.

As a result of various subsequent tests, the inventors discovered that by causing nickel sulfide produced using a hydrometallurgical process to react with copper ions, oxidation of the sulfur can be effectively suppressed.

It is thought that this finding is because the ratio of nickel to sulfur in the nickel sulfide shows a slight excess of sulfur, and this excess sulfur oxidizes readily comparing with other elements, whereas if copper ions are added and the excess sulfur sulfidizes these copper ions and becomes bound, then this rapid sulfur oxidation tends not to occur. The copper in nickel matte produced using a pyrometallurgical process can be used as the copper ions. Furthermore, metals other than copper ions may also be used provided that the metal forms a sulfide more readily than nickel.

EXAMPLES

A series of examples are described below, with reference to the flow charts showing the present invention.

FIG. 1 is a flow chart showing a nickel refining method of the present invention.

In the present invention, after a cementation reaction is conducted between copper ions and the nickel sulfide produced from nickel oxide ore using a hydrometallurgical process, the solution is separated from the residue, and the copper and the nickel in the residue are then chlorine leached.

Consequently, the oxidation of the sulfur in the nickel sulfide is suppressed, and the leach rates of nickel and cobalt are increased.

Preferably the cementation reaction is performed with an oxidation-reduction potential as measured by a silver-silver chloride electrode of below −20 mV. More preferably this is performed with the oxidation-reduction potential is below −100 mV.

Figure 2:
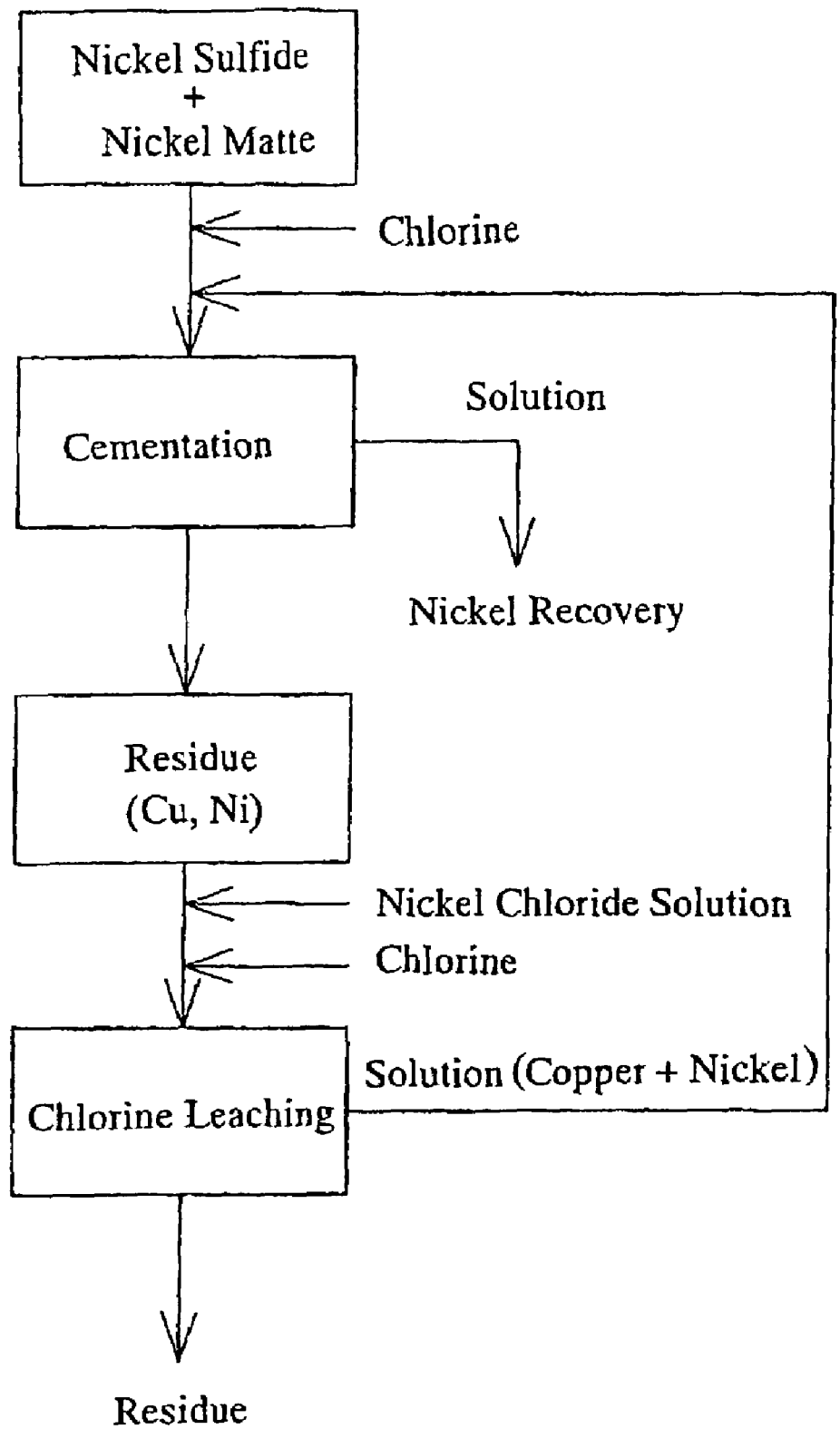
FIG. 2 is a flow chart to show an industrial example of the present invention.

FIG. 2 shows a flow chart of an industrial example of the present invention.

In the present embodiment, nickel matte containing copper as the source of copper ions is included in the raw materials. Furthermore, the chlorine leaching solution which contains copper is used cyclically as the cementation solution.

The present invention is further described below according to a series of examples.

Example 1

Nickel matte (composition: Ni: 77.1%, Co: 0.88%, S: 19.6%, Cu: 1.89%) produced using a pyrometallurgical process and nickel sulfide (composition: Ni: 31.7%, Co: 2.42%, S: 20.8%), produced from nickel oxide ore by using a hydrometallurgical process where the nickel is precipitated with $H_2S$, were used as the raw materials.

4.5 kg of the nickel matte produced using a pyrometallurgical process and 1.5 kg of the nickel sulfide produced using a hydrometallurgical process (a ratio of 3:1) were added to a solution of $NiCl_2$ with a nickel concentration of 115 g/l and $CuCl_2$ with a copper concentration of 30.9 g/l which was heated to 70° C., and the solution was stirred for three hours while the cementation reaction proceeded. At this time, the oxidation-reduction potential (ORP) as measured by a silver-silver chloride electrode was −185 mV.

The nickel extraction, the copper precipitation rate and the sulfur oxidation rate were measured after the cementation reaction, and the results are shown in Table 1.

As described above, it was confirmed by X-ray diffraction that the form of the nickel sulfide produced using a hydrometallurgical process displayed a high intensity $Ni_3S_4$ peak, but the same X-ray diffraction performed on the nickel sulfide after the cementation reaction experiment showed no such $Ni_3S_4$ peak, and only the NiS peak intensity was high.

Chlorine leaching of copper and nickel from the residue produced by the cementation reaction was performed. The residue was placed in a nickel chloride solution (Ni: approximately 70 g/l), and after the temperature had been raised to 105° C., chlorine gas was blown into the solution, and the solution was stirred for three hours, while the oxidation-reduction potential (ORP), as measured by a silver-silver chloride electrode, was controlled at a value of 520 mV.

After completion of the reaction, the reaction mixture was filtered, and the leaching solution and the residue were then analyzed. The results showed that the nickel concentration in the leaching solution was 155 g/l and the copper concentration was 31.2 g/l. This leaching solution was reused in subsequent cementation reactions. The composition of the residue was Ni: 0.62%, Co: 0.06%, S: 96%.

The results of calculating the nickel leach rate, the cobalt leach rate, and the copper leach rate based on these analysis results are shown in Table 2.

The total sulfur oxidation rate from the cementation reaction process and the chlorine leaching process was 1.6%, whereas the nickel leach rate was over 99%. The leach rate of the cobalt contained in the nickel sulfide was over 96%.

TABLE 1

|  | ORP(mV) | Nickel leach rate (%) | Copper precipitation rate (%) | Sulfur oxidation rate (%) |
| --- | --- | --- | --- | --- |
| Example 1 | −185 | 65.3 | 100 | 0 |
| Example 2 | −100 | 26.4 | 99.7 | 0 |
| Example 3 | −20 | 37.2 | 88.0 | 0 |
| C.E. 1 | 97 | 28.6 | 48.5 | 0 |
| C.E. 2 | 231 | 27.4 | 12.4 | 0 |

C.E. = Comparative Example

TABLE 2

|  | Nickel leach rate (%) | Cobalt leach rate (%) | Sulfur oxidation rate (%) | Copper leach rate (%) |
| --- | --- | --- | --- | --- |
| Example 1 | 99.5 | 96.7 | 1.6 | >99 |
| C.E. 3 | 95.6 | 95.4 | 4.8 | >99 |

Example 2

A cementation reaction was performed in the same manner as in example 1, with the exception that the ORP as measured by a silver-silver chloride electrode was set to a value of −100 mV.

The results of the cementation reaction are shown in Table 1.

Example 3

A cementation reaction was performed in the same manner as in example 1, with the exception that the ORP as measured by a silver-silver chloride electrode was set to a value of −20 mV.

The results of the cementation reaction are shown in Table 1.

Comparative Example 1

A cementation reaction was performed in the same manner as in example 1, with the exception that the ORP as measured by a silver-silver chloride electrode was set to a value of 97 mV.

The results of the cementation reaction are shown in Table 1.

Comparative Example 2

A cementation reaction was performed in the same manner as in example 1, with the exception that the ORP as measured by a silver-silver chloride electrode was set to a value of 231 mV.

The results of the cementation reaction are shown in Table 1.

As is apparent in Table 1, in example 1 through example 3 where the ORP is −20 mV or less, the cementation reaction proceeded well, the solution and the residue were separated from each other, and 80% or more of the copper in the solution was precipitated. In addition, the precipitation rate of the copper increased as the ORP became lower.

If any copper remains in the solution, this copper affects the following process in which nickel is recovered, by contaminating the nickel, and so the copper must be precipitated and as much copper must be removed from the solution as possible. Consequently, the ORP as measured by a silver-silver chloride electrode must be below −20 mV, and preferably below −100 mV.

If the leaching solution produced in the process of chlorine leaching the cementation residue is used as the nickel solution for the cementation reaction, it can also be used for leaching the nickel. Furthermore, the copper can be reused, but to maintain balance, any copper deficiency should either be replenished or excess copper supplied.

The temperature during the cementation reaction was varied between 50° C. and 90° C. Naturally, the reactivity is better at higher temperatures, but because there is no significant difference in the sulfur oxidation rate, the nickel leach rate, and the copper leach rate at temperatures of 70° C. or higher, it is most economical to conduct the cementation reaction at approximately 70° C.

Furthermore, the copper ions used in the cementation reaction may be either monovalent or bivalent, and the amount used should be an amount sufficient to bind the sulfur without affecting the subsequent processes.

Comparative Example 3

In the same manner as in example 1, nickel sulfide produced using a hydrometallurgical process was used as the raw material.

The nickel sulfide was placed in a nickel chloride solution (Ni: approximately 70 g/l), without first being reacted with copper ions, and after the temperature of the solution had been raised to 105° C., chlorine gas was blown into the solution, and the solution was stirred for three hours, while the oxidation-reduction potential (ORP), as measured by a silver-silver chloride electrode, was controlled at a value of 520 mV.

In comparative example 3, the sulfur oxidation rate was 4.8%, which is higher than in example 1 where the cementation reaction with copper ions was performed.

In this manner, it was possible to confirm that by using the nickel refining method of the present invention, the sulfur oxidation rate can be lowered, while at the same time the nickel and cobalt leach rates are increased.

According to a nickel refining method of the present invention, the oxidation of sulfur can be suppressed, and it is possible to leach cobalt and nickel even from nickel sulfide produced from nickel oxide ore using a hydrometallurgical process, with a leach rate which is higher than that of conventional methods.

What is claimed is:

1. A method of recovering nickel from nickel oxide containing ore comprising:
    (a) converting nickel oxide to nickel sulfide by a hydrometallurgical process, the nickel sulfide containing $Ni_3S_4$ and the ratio of nickel to sulfur in the nickel sulfide being less than 1 (N1/S<1);
    (b) reacting the nickel sulfide from step (a) with copper ions in a liquid/liquid cementation reaction to form a solution and a residue comprising copper sulfide and/or nickel sulfide mainly containing NiS;
    (c) separating the solution from the residue; and
    (d) leaching the residue with chlorine and recovering nickel from the leaching solution.

2. The nickel recovery method of claim 1, wherein the cementation reaction is performed with an oxidation-reduction potential as measured by a silver-silver chloride electrode of below −20 mV.

3. The nickel recovery method of claim 1, wherein the cementation reaction is performed with an oxidation-reduction potential as measured by a silver-silver chloride electrode of below −100 mV.

4. The nickel recovery method of claim 1, wherein nickel matte containing copper is included in the raw materials, as a source of the copper ions for the cementation reaction.

5. A method of recovering nickel from nickel oxide containing ore comprising:
    (a) convening nickel oxide to nickel sulfide by a hydrometallurgical process, the nickel sulfide containing $Ni_3S_4$ and the ratio of nickel to sulfur in the nickel sulfide being less than 1 (NI/S<1);
    (b) reacting the nickel sulfide from step (a) with copper ions in a liquid/liquid cementation reaction to form a nickel solution and a residue comprising copper sulfide and/or nickel sulfide mainly containing NiS;
    (c) separating the nickel solution from the residue and recovering nickel from the nickel solution; and
    (d) leaching the residue with chlorine and using the leaching solution having copper and nickel as a source of the copper ions for the cementation reaction of step (b).

6. The nickel recovery method of claim 5, wherein the cementation reaction is performed with an oxidation-reduction potential as measured by a silver-silver chloride electrode of below −20 mV.

7. The nickel recovery method of claim 5, wherein the cementation reaction is performed with an oxidation-reduction potential as measured by a sliver-silver chloride electrode of below −100 mV.

8. The nickel recovery method of claim 5, wherein nickel matte containing copper is included in the raw materials, as a source of the copper ions for the cementation reaction.

9. A method of limiting the sulfur oxidation rate of excess sulfur in nickel sulfide produced during a hydrometallurgical process containing a $Ni_3S_4$ concentration solution comprising: contacting the solution with copper ions, precipitating the dissolved copper as copper sulfide from the nickel chlorine leach solution and preferential chlorine leaching of nickel from copper.

* * * * *